United States Patent [19]
Nakayama et al.

[11] Patent Number: 5,748,386
[45] Date of Patent: May 5, 1998

[54] ZOOM LENS BARREL INCLUDING A MECHANISM FOR MOVING LENS GROUPS

[75] Inventors: Haruki Nakayama; Yuichi Honda; Toshio Imaizumi, all of Hachioji, Japan

[73] Assignee: Konica Corporation, Tokyo, Japan

[21] Appl. No.: 782,665

[22] Filed: Jan. 15, 1997

Related U.S. Application Data

[62] Division of Ser. No. 226,562, Apr. 12, 1994, Pat. No. 5,668,670.

Foreign Application Priority Data

Apr. 30, 1993 [JP] Japan ................... 5-104456

[51] Int. Cl.⁶ ................................................. G02B 15/14
[52] U.S. Cl. ................................... 359/694; 359/701
[58] Field of Search .............................. 359/694, 699, 359/700, 701, 704, 705, 829

[56] References Cited

U.S. PATENT DOCUMENTS

| | | | |
|---|---|---|---|
| 4,135,786 | 1/1979 | Ikemori | 359/683 |
| 4,275,952 | 6/1981 | Uesugi | 359/700 |
| 4,421,389 | 12/1983 | Muryoi | 359/704 |
| 4,626,076 | 12/1986 | Oshima | 359/688 |
| 4,750,821 | 6/1988 | Yamamoto | 359/697 |
| 4,822,153 | 4/1989 | Tomori et al. | 359/700 |
| 4,848,884 | 7/1989 | Enomoto | 359/700 |
| 4,971,427 | 11/1990 | Takamura | 359/700 |
| 4,990,945 | 2/1991 | Cho et al. | 354/195.12 |
| 5,014,077 | 5/1991 | Yomogizawa et al. | 354/187 |
| 5,170,294 | 12/1992 | Hakaguchi | 359/697 |
| 5,223,873 | 6/1993 | Tsuboi | 396/82 |
| 5,233,472 | 8/1993 | Haraguchi et al. | 359/694 |
| 5,301,066 | 4/1994 | Higuchi | 359/698 |
| 5,333,024 | 7/1994 | Labaziewicz | 396/79 |
| 5,416,519 | 5/1995 | Ohtake | 348/351 |
| 5,488,513 | 1/1996 | Tanaka | 359/699 |

FOREIGN PATENT DOCUMENTS

| | | |
|---|---|---|
| 61-269131 | 5/1985 | Japan . |
| 61-259210 | 11/1986 | Japan . |
| 63-287833 | 11/1988 | Japan . |
| 3-248110 | 11/1991 | Japan . |

*Primary Examiner*—Georgia V. Epps
*Assistant Examiner*—Ricky Mack
*Attorney, Agent, or Firm*—Finnegan, Henderson, Farabow, Garrett & Dunner, L.L.P.

[57] ABSTRACT

A zoom lens barrel in which a zoom lens is switched to a plurality of focal lengths by a moving member by which a plurality of lens groups are moved in the direction of optical axis. After a desired focal length has been selected, a focusing operation is conducted by the moving member. At least two lens groups, which are moved for switching focal lengths, are moved while a distance between lens groups is being changed so that the focusing operation can be conducted.

10 Claims, 4 Drawing Sheets

ZOOM LENS BARREL INCLUDING A MECHANISM FOR MOVING LENS GROUPS

This is a division of application Ser. No. 08/226,562, which is now U.S. Pat. No. 5,668,670, filed Apr. 12, 1994.

BACKGROUND OF THE INVENTION

The present invention relates to a compact zoom lens barrel.

A conventional zoom lens barrel comprises a zoom system, by which one focal length is switched to another focal length, and a focusing driving system, by which focusing is conducted. In conventional zoom lens barrels, several system, in which zooming and focusing are linked together, have been proposed.

For example, in Japanese Patent Publication Open to Public Inspection No. 287833/1988, and No. 248110/1991, the following has been proposed: a focal length switching cam portion and a focusing cam portion are linked together, and form one driving system; focal length switching and focusing are conducted by this one driving system, and a subsidiary optical system is not necessary. In these publications, a zooming region is divided into a focal length switching region and focusing region; a focal length is selected stepwise; when a parallel cam portion, which is not moved in the direction of an optical axis at the time of focusing, is provided, a lens group other than a focusing lens group is used for focal length switching and focusing; and a lens barrel is made to be small and the cost is lowered. In Japanese Patent Publication Open to Public Inspection No. 259210/1986, a whole lens system is protruded at the time of focusing, however, disadvantageous points, which will be described later, occur in the whole lens system protrusion.

In these conventional technologies, the effect of thinning the lens barrel is small, and when a zoom lens, in which sensitivity for errors in distance between lens groups (which will be described in detail later) is high, is used for focusing by the zoom lens barrel, there are many disadvantageous points to be solved, such as focusing accuracy. Further, focusing operations of respective lenses have not been disclosed.

Presently, a zoom type compact camera advances in the direction of down-sizing and thinning of the camera body, however there are many obstacles to this advancement. First of these is dimensions of the zoom lens. When too much thinning is attempted, an fb (flange back) becomes too short, an aperture of the final lens, which is closest to a film surface, becomes large, and a switching mechanism for panorama photographing can not be housed in the camera body. Further, when the aperture of the final lens becomes large, the diameter of the lens barrel becomes too large, so that the camera body itself tends to become larger. Due to the foregoing, the present inclination is as follows: when the total length of the lens is kept to a certain value, and the lens barrel is constructed in the manner of double-structure, the amount in which the lens can be driven is kept constant and the length of the lens barrel is shortened.

However, the diameter of the double-structured lens barrel is large, and although the effect of thinning the lens barrel is high, the effect is low for a decrease of the diameter of the lens barrel. Accordingly, in order to decrease the diameter of the lens barrel, the structure of a cam cylinder+a cam pin+a helicoid is changed to a structure of a double helicoid+an inner cam.

This is structured as follows: a front lens group portion is linearly driven through a helicoid of the cam cylinder which is rotated by a lens barrel driving motor; and a rear lens group portion is driven by an inner cam provided inside the cam cylinder. Since the cam portion is not exposed on the external visible surface, the diameter of the lens barrel can be made small since the cam cylinder can also be used for an external visible part, and it is not necessary to provide a separate driving gear to the metallic cam.

However, the diameter of the front lens group portion, in which a focusing mechanism is housed, is still large. When a 6V battery is changed to a 3V battery in order to make the camera more compact, a focusing motor and the like can be enlarged in order to obtain a higher output power.

Further, in the zoom lens, an FC adjustment in which both a telescopic lens and a wide lens focus on the same plane, and an ff adjustment, in which both lenses, having focused on the same plane, focus on a focal plane, are conducted. In the FC adjustment, a space for adjustment is necessary between a diaphragm and the front lens group, and positions of the diaphragm and lenses are changed depending on the adjustment, which leads to problems, causing the diameter of the front lens group portion to be large. In the ff adjustment, it is necessary that the whole lens barrel is moved, and it is necessary that large parts, which are appropriately strong for supporting the movement of the lens barrel, are provided on the lens barrel, so that the diameter of the lens barrel becomes larger.

The number of lenses is decreased at the sacrifice of the brightness (F-number) of the photographic lens, and the dimensions of the lens barrel is made to be compact, accompanied with requirements for compactness and low cost of the lens barrel. Accordingly, lens performance and the like are necessarily deteriorated. Part members of the lens barrel are made of plastic. Accordingly, the focusing performance, and resolving performance are necessarily sacrificed due to the dimensional accuracy, deformation, and the like. As described above, the structure of compact zoom-lens cameras has been changed many times for the purpose of compactness and low cost. However, the compactness has almost reached its limit, and lower cost can not be achieved without sacrificing specifications and performance.

SUMMARY OF THE INVENTION

The above-mentioned problems can be overcome by a zoom lens barrel according to the present invention, in which the zoom lens barrel is characterized in that: a zoom lens is switched to a plurality of focal lengths by a moving means by which a plurality of lens groups are moved in the direction of optical axis; after a desired focal length has been selected, a focusing operation is conducted by the moving means; at least two lens groups, which are moved for switching focal lengths, are moved while a distance between lens groups is being changed so that the focusing operation can be conducted.

DETAILED DESCRIPTION OF THE PREFERRED EMBODIMENTS

Figure 1:
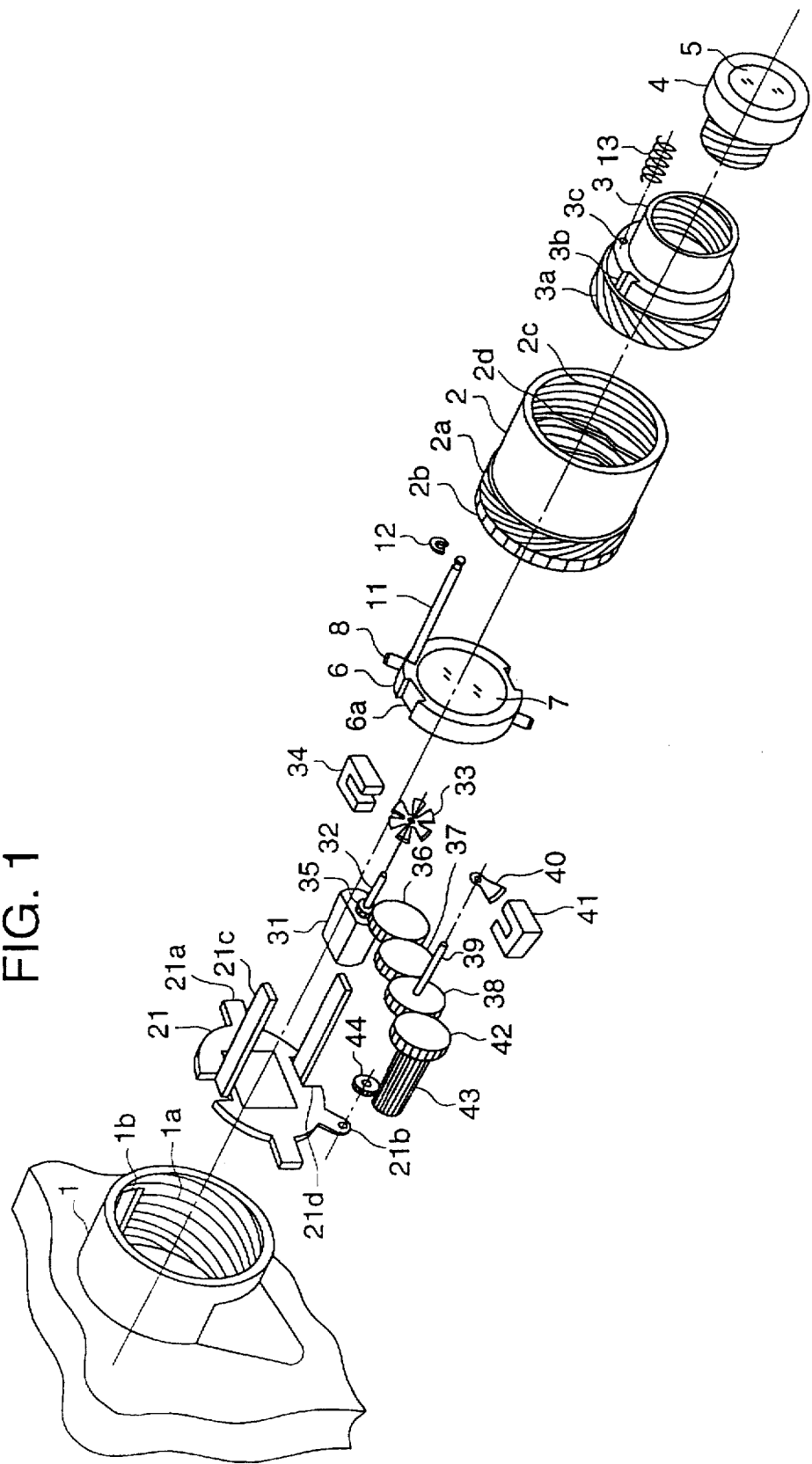
FIG. 1 is an exploded perspective view of a zoom lens barrel according to the present invention.

Initially, characteristics of the present invention and advantageous features, which are compared with the prior art, will be explained logically and interspersing with simulation data. Next, embodiments of specific structures will be explained while referring to the drawings.

An object of the present invention is to increase compactness and lower cost of the zoom lens barrel for a compact camera, and simultaneously to improve the focusing performance, focusing operation and lens performance. When a cam portion for switching focal lengths and a cam portion for focusing are sequentially provided in the zoom lens barrel, a focal length switching driving means and a focusing driving means can be included in one driving means. When at least two lens groups, which are used for varying the magnification at the time of focusing, are moved while a distance between the lenses is being changed, influences of the accuracy of a focusing stop on the accuracy of the focal position are decreased, focusing control can be conducted with higher resolution, the zoom lens barrel can be compact by adoption of a high error sensitivity lens, a focal position adjustment mechanism is simplified, the lens performance can be made higher by improvement, and the zoom lens barrel can be more compact and cost less.

To move at least two lens groups at the time of focusing in order to switch a focal length will be called "twin focus" hereinafter. Further, in a lens barrel in which a focal length switching operation and a focusing operation are conducted by a single driving motor, a mechanism, by which the focal length switching operation and the focusing operation are selected in specific increments, will be called a "step zoom" hereinafter.

[A decrease of influences for improving the resolving power of focusing control and an error of a stopping position on the accuracy of a focal position]

The error sensitivity of a zoom lens will be described below. In the zoom lens in which two lens groups composed of a first lens group (FC lens) and a second lens group (RC lens) are moved, a change of lens positions does not necessarily coincide with a change of a focal position. For example, when only a front lens of the lens having error sensitivity of 8 times is moved 1 mm under the telescopic conditions, the focal position is moved 8 mm. This is called error sensitivity in distance between FC and RC, or error sensitivity in distance between lens groups, and shows the difficulty in which high focusing performance is achieved in a zoom lens. (hereinafter, called error sensitivity).

In the case of 2 group zooming, the error sensitivity is expressed by the following equation.

$$G = \Delta fb/\Delta d = (f/f1)^2 \qquad (1)$$

Where,

G: error sensitivity $\Delta d$: a moving amount of the lens distance $\Delta fb$: an amount of a change of a focal position f1: a focal length of the first lens group (FC group)

f: a synthetic focal length (a focal length of the zoom lens system)

That is, the error sensitivity has a larger value as the focal length of the first lens group is shorter, or the synthetic focal length is larger.

The synthetic focal length is expressed by the following equations:

$$1/f = (1/f1) + (1/f2) - \{H/(f1 \cdot f2)\} \qquad (2)$$

Where,

H: a distance between principal points of the first lens group and the second lens group f1: a focal length of the first lens group (FC group)

f2: a focal length of the second lens group (RC group)

When the focal length of an FC lens (+) is enlarged, the synthetic focal length becomes larger. When the focal length of an RC lens (-) is enlarged, the synthetic focal length becomes shorter, and when a distance between lenses is enlarged, the synthetic focal length becomes shorter.

For example, in the case where the required accuracy for focusing is ±0.15, when the sensitivity for the error is supposed to be 7.5, the sensitivity for the error can not be achieved without decreasing the distance between lenses to less than ±0.02. The reason for increasing the sensitivity for the error is for the purpose of down-sizing the zoom lens barrel. When the focal length can be changed with a small amount of lens protrusion, the lens barrel can be made smaller. Even when compactness of the lens barrel is not required, the sensitivity for errors is necessary to some extent in order to prevent the lens barrel from being enlarged, and to ensure the lens performance. The sensitivity for errors, the value of which is about 6 to 9, is adopted in many cases in the case of a 2 power telephoto type zoom lens barrel, the focal length of which is 35 to 70 mm.

As an example, in a two-group zoom lens, in which the focal length of the first lens group is 24.5 mm, and the focal length of the second lens group is -22.5 mm, the distance between principal points of the first and the second lens groups is 17.28 mm in a wide lens (f=36.0 mm), and 10.03 mm in a telescopic lens (f=68.5 mm), the sensitivity for errors is 2.15 in the wide lens, and 7.72 in the telescopic lens from equations ① and ②.

Although the movement amount of the front lens in a front lens focusing type lens is approximately 1.2 mm in the case of a finite distance 0.6 m, this movement amount is only 5.28% of the 22.72 mm movement of the zoom lens (the movement of the FC lens from wide∞to tele∞). When this focusing region is divided into 100 increments (100 steps) for the purpose of auto-focusing, the movement ratio of the front lens is 0.053% for each step. In the auto-focusing control by the drive of the zoom lens barrel in a mechanism, which is used for focusing and also for switching the focal length, a minute movement amount is controlled with respect to the total zooming amount. In order to control this minute movement amount and to use the lens, in which the sensitivity for errors is high, the allowable amount for backlash and deformation of the lens barrel is drastically reduced, and also the allowable amount for a rotation angle error at the time of control for the lens barrel stop, is reduced.

When the rotation angle of the cam barrel is enlarged in order to enlarge the focusing region, this minute amount is made larger. However, the focal length switching region is also enlarged, and the movement time for switching the focal length is also increased. Here, when a gear ratio of the driving system is changed, there is the possibility that satisfactory torque can not be obtained. Further, when the focal length is switched by a high voltage, and a focusing operation is conducted by a low voltage, the timed relationship can be well balanced. However, these operations can not be conducted when the capacity of the power supply is not adequate, and the driving circuit becomes complex, which leads to excessive overall cost. In any case, the relationship between the focal length switching operation and the focusing operation in a mechanical region is not changed.

Accordingly, it is desired that the focusing region is enlarged by a method which does not affect focal length switching. When the spread amount of the lens distance, generated at the time of focal length switching, is reduced, the movement amount of the front lens can be increased. Accordingly, when the RC lens is moved in the direction of the FC lens movement at a predetermined ratio, since the spread amount of the lens distance between the FC and RC lenses is decreased with respect to the movement amount of the FC lens, the movement amount of the FC lens can be increased. For example, when the RC lens is moved by about half of the movement amount of the FC lens, the movement amount of the FC lens is 1.2 mm in the case of a front lens protrusion type, and is approximately 2.1 mm in the case of twin-focusing. The resolving power is improved by 77%, and the sensitivity for errors of the lens barrel stop is decreased by the improved amount of the resolving power. When a lens having a higher sensitivity for errors is used by utilizing this decrease of the sensitivity for errors of the lens barrel stop, the whole lens barrel can be made smaller.

When the error of front lens focusing is compared with that of twin focusing of 2:1, in the lens in which the sensitivity for errors is 7.79, the changed amount of fb at the time when the FC lens is moved by 0.1 mm, is as follows.

| Front lens focusing | 0.779 mm |
|---|---|
| Twin focusing | 0.440 mm |

The amount of the fb of twin focusing is changed by only 56% of the amount of the fb in front lens focusing.

An movement amount of the focusing position is calculated by the following equation.

$$\Delta fb = (FC_S - RC_S) \times G + RC_S$$

Where, $\Delta fb$: the movement amount of focusing position $FC_S$: the movement amount of the FC lens $RC_S$: the movement amount of the RC lens G: the sensitivity for errors In this case, where the movement amount of the RC lens is the same as that of the FC lens, the case corresponds to the whole lens barrel protrusion, and is not affected by the sensitivity for errors.

The following can be found: when the RC lens, other than the FC lens, is moved at the time of focusing, the movement amount of the FC lens is increased; and the influence on the error of the focal position is decreased with respect to the error of the rotation angle at the time of the control of the lens barrel stop. Accordingly, when twin focusing is conducted, the ratio of the region of focal length switching to the region of focusing can be changed; the influence due to the error at the time of control of the lens barrel stop can be decreased; and the resolving power for the control can be changed. When the RC lens is moved in the reverse direction to the FC lens, effects opposite to the foregoing can be expected. When the RC lens is moved in the same direction as the FC lens, and the movement amount of the RC lens is larger than that of the FC lens, the total movement amount, which is larger than that of the whole lens barrel protrusion type, can be obtained. When ($\Delta fb$ is in the range of "+") or the movement ratio of the FC and RC lenses is changed between a wide range and a telescopic range, lens design, in which an amount of the focusing control (the rotation angle of the cam barrel) is made to be constant, can be conducted.

[Simplification of the focal position adjustment and a mechanism thereof]

Next, a focal position adjustment method will be described. In a conventional zoom lens, focal lengths are continuously provided in the whole range. Accordingly, when only the lens position of one lens group is simply adjusted, focusing on the whole range can not be conducted. Therefore, two lens position adjustment, that is, FC adjustment and ff adjustment are necessary. The FC adjustment is adjustment by which the focal position is adjusted in the same plane in both the telescopic range and the wide range, and generally, the FC adjustment is conducted when the FC lens is moved forward and/or backward.

(Adjustment of the distance between lens groups)

Next, the ff adjustment, by which the whole lens groups are moved, is conducted so that the lens, which has been focused in the same plane, is focused on the focal plane of the camera. For example, when the focal position of a wide lens is deviated by 0.4 mm in the forward direction, and the focal position of a telescopic lens is deviated by 1.4 mm in the backward direction under the conditions that the lens has been just assembled, the sufficient focusing operation of the wide lens and the telescopic lens can be conducted when the distance between lenses is enlarged by 0.3 mm, and the whole lens position is moved backward by 1.0 mm (in the case where the sensitivity for errors of the wide lens is 2: and that of the telescopic lens is 8).

However, it is a very rare case that the lens can focus on the focal plane in the whole range of the lens by this method. This adjustment method is suitable for only in a case where ideal FC, RC lenses and cams are provided. In many cases, good focusing can not be obtained in the middle range. In such a case, since the reason for non focusing is not due to only the distance between the RC and FC lenses and these positions, suitable focusing can not be obtained by only the adjustment of the lens distance and the movement of the whole lenses. In many cases, it is difficult to obtain good focusing in the central range of the zoom lens due to dimensional errors of cams or mechanical portions, and errors of the lens system.

Recently, it has been proposed that the continuous focal length is controlled stepwise, and the movement amount of the focusing lens is corrected for each focal length which is obtained stepwise (by software using an EEP-ROM). Accordingly, it is solved that the focusing performance is deteriorated at the center of the zoom lens. The present invention is a typical example in which the focal length is controlled stepwise, and the focusing performance is improved by using the software technology.

The present invention is accomplished when the cam inclination for protrusion of the FC and RC lenses which are moved at the time of focusing, is kept constant; and when the ∞ side and the closest side of a horizontal cam are extended. The focal position is adjusted according to the protrusion characteristics for each focal length which can be selected stepwise. This adjustment is called twin-focusing adjustment. That is, the focal position adjustment is conducted by only the rotation angle adjustment of the cam barrel, and the adjustment of the distance between lens groups and the whole position adjustment are not conducted. In other words, when an amount of focusing is changed, the focal position adjustment is conducted. This operation is the same as that of a single focus lens camera, and in this case it is conducted for each focal length. As compared with the conventional operations in which the focal position is checked, adjusted and corrected in both the telescopic range and the wide range, the adjusting operation is greatly simplified. An EEP-ROM is used for storing this individual difference for each focal length.

Here, the focal length error of the twin-focus type focal position adjustment is simulated as follows. Conditions of the simulation are as follows.

[Sensitivity for error of distance between lens groups]
When the FC lens group is moved forward,

| wide (M) | 2.16 times |
|---|---|
| middle (M2) | 4.47 times |
| telescopic (T) | 7.79 times |

[Focal length error]
When the error of the distance between lens groups is +0.1 mm,

| wide | −0.6402% |
|---|---|
| middle | −0.9673% |
| telescopic | −1.2044% |

[The calculation equation for FC, ff adjustments of the conventional zoom]
An FC adjustment amount=(ΔfbW−ΔfbT)/(GT−GW)
An ff adjustment=−ΔfbW−(FC adjustment amount×GW)=−ΔfbT−(FC adjustment amount×GT)
Where,
GW: the sensitivity for error in the wide range
GT: the sensitivity for error in the telescopic range
ΔfbW: the deviation amount of focusing in the wide range
ΔfbT: the deviation amount of focusing in the telescopic range

[A twin-focus ratio]

$$FC_S:RC_S=2:1$$

[A focusing correction amount of the twin-focus]
the sensitivity for error is defined as G, and from equation ③,
Δfb=correction Ad×G+correction Δd
correction Δd=Δfb/(G+1)
correction in the wide range Δd=Δfb/3.16
correction in the middle range Δd=Δfb/5.74
correction in the telescopic range Δd=Δfb/8.79
Where,
Δfb: an error of the focal position,
Δd : the distance between lenses,
ΔFC: the deviation amount of the distance between lenses before adjustment,
Δff: the deviation amount of the whole lens before adjustment For simplification, it is assumed that the FC lens and RC lens have no error.

1. When the focal position adjustment is conducted on a lens unit which has an error of 0.1 mm in the forward direction in only the FC lens group (ΔFC=0.1 mm),

| Before the adjustment | W | M2 | T |
|---|---|---|---|
| Δfb | 0.216 mm | 0.474 mm | 0.779 mm |
| The focal length | −0.640% | −0.967% | −1.204% |

In a conventional case:
since the focal position is perfectly corrected by the adjustment of the distance between lenses, there is no error in the focal length. (FC adjustment)

| Error Δd | 0 mm | 0 mm | 0 mm |
|---|---|---|---|
| Error of the focal length | 0% | 0% | 0% |
| Δfb after the adjustment | 0 mm | 0 mm | 0 mm |

When the FC adjustment is conducted for each focal length:
same as the conventional case
When the ff adjustment is conducted for each focal length:

| Error Δd | 0.1 mm | 0.1 mm | 0.1 mm |
|---|---|---|---|
| Error of the focal length | −0.640% | −0.967% | −1.204% |
| Δfb after the adjustment | 0 mm | 0 mm | 0 mm |
| In the present invention: | W | M2 | T |
| Correction Δd | −0.068 mm | −0.083 mm | −0.089 mm |
| Error Δd | 0.032 mm | 0.017 mm | 0 011 mm |
| Error of the focal length | −0.203% | −0.169% | −0.137% |
| Δfb after the adjustment | 0 mm | 0 mm | 0 mm |

2. The focal position adjustment is conducted on a lens unit in which the whole lens groups has an error of 0.1 mm in the forward direction. (Δff=0.1 mm)

| Before adjustment | W | M2 | T |
|---|---|---|---|
| Δfb | 0.1 mm | 0.1 mm | 0.1 mm |
| Error of the focal length | 0% | 0% | 0% |

In a conventional case:
since the focal position is perfectly corrected by the adjustment of the whole lens groups, there is no error in the focal length. (ff adjustment)

| Error Δd | 0 mm | 0 mm | 0 mm |
|---|---|---|---|
| Error of the focal length | 0% | 0% | 0% |
| Δfb after the adjustment | 0 mm | 0 mm | 0 mm |

In the case where the FC adjustment is conducted for each focal length:

| Error Δd | −0.0460 mm | −0.021 mm | −0.013 mm |
|---|---|---|---|
| Error of the focal length | 0.296% | 0 204% | 0 155% |
| Δfb after adjustment | 0 mm | 0 mm | 0 mm |

In the case where an ff adjustment is conducted for each focal length:
Same as the conventional case.

| In the present invention: | W | M2 | T |
|---|---|---|---|
| correction Δd | −0.032 mm | −0.017 mm | −0.011 mm |
| Error Δd | −0.032 mm | −0.017 mm | −0.011 mm |
| Error of the focal length | 0.203% | 0.169% | 0.137% |
| Δfb after the adjustment | 0 mm | 0 mm | 0 mm |

3. The focal position adjustment is conducted on a lens unit, in which the FC lens group has an error of 0.1 mm in the forward direction, only at the wide end.

| Before adjustment: | W | M2 | T |
|---|---|---|---|
| Δfb | 0.216 mm | 0. mm | 0.mm |
| Error of the focal length | −0 640% | 0% | 0% |
| In the conventional case: | | | |
| an FC adjustment amount | 0.0384 mm | | |
| an ff adjustment amount | −0.2989 mm | | |
| Error Δd | 0.138 mm | 0.038 mm | 0.038 mm |
| Error of the focal length | −0.886% | −0.371% | −0.462% |
| Δfb after the adjustment | 0 mm | −0.117 mm | 0 mm |

In the case where the FC adjustment is conducted for each focal length:

| Error Δd | 0 mm | 0 mm | 0 mm |
|---|---|---|---|
| Error of the focal length | 0% | 0% | 0% |
| Δfb after the adjustment | 0 mm | 0 mm | 0 mm |

In the case where the ff adjustment is conducted for each focal length:

| Error Δd | 0.1 mm | 0 mm | 0 mm |
|---|---|---|---|
| Error of the focal length | −0.640% | 0% | 0% |
| Δfb after the adjustment | 0 mm | 0 mm | 0 mm |
| In the present invention: | W | M2 | T |
| correction Δd | −0.068 mm | 0 mm | 0 mm |
| Error Δd | 0.032 mm | 0 mm | 0 mm |
| Error of the focal length | −0.203% | 0% | 0% |
| Δfb after the adjustment | 0 mm | 0 mm | 0 mm |

4. The focal position adjustment is conducted on a lens unit in which the FC lens group has an error of 0.1 mm in the forward direction, only at the telescopic angle end.

| Before adjustment | W | M2 | T |
|---|---|---|---|
| Δfb | 0 mm | 0.mm | 0.779 mm |
| Error of the focal length | 0% | 0% | 1.204% |
| In the conventional case: | | | |
| an FC adjustment amount | −0.1384 mm | | |
| an ff adjustment amount | 0.2989 mm | | |
| Error Δd | −0.138 mm | −0.138 mm | 0.038 mm |
| Error of the focal length | 0.886% | 1.338% | 0.462% |
| Δfb after the adjustment | 0 mm | −0.357 mm | 0 mm |

In the case where the FC adjustment is conducted for each focal length:

| Error Δd | 0 mm | 0 mm | 0 mm |
|---|---|---|---|
| Error of the focal length | 0% | 0% | 0% |
| Δfb after the adjustment | 0 mm | 0 mm | 0 mm |

In the case where the ff adjustment is conducted for each focal length:

| Error Δd | 0. mm | 0 mm | 0.1 mm |
|---|---|---|---|
| Error of the focal length | 0% | 0% | −1.2040% |
| Δfb after the adjustment | 0 mm | 0 mm | 0 mm |
| In the present invention: | W | M2 | T |
| Correction Δd | 0 mm | 0 mm | −0.089 mm |
| Error Δd | 0 mm | 0 mm | 0 011 mm |
| Error of the focal length | 0% | 0% | −0.137% |
| Δfb after the adjustment | 0 mm | 0 mm | 0 mm |

5. The focal position adjustment is conducted on a lens unit, in which the FC lens group has an error of 0.1 mm in the forward direction, only at the wide angle end.

| Before adjustment: | W | M2 | T |
|---|---|---|---|
| Δfb | 0.1 mm | 0.mm | 0.mm |
| Error of the focal length | 0% | 0% | 0% |
| In the conventional case: | | | |
| an FC adjustment amount | 0.0178 mm | | |
| an ff adjustment amount | −0.1384 mm | | |
| Error Δd | 0.018 mm | 0.018 mm | 0.018 mm |
| Error of the focal length | −0.114% | −0.172% | −0.214% |
| Δfb after the adjustment | 0 mm | −0.054 mm | 0 mm |

In the case where the FC adjustment is conducted for each focal length:

| Error Δd | −0.048 | 0 mm | 0 mm | 0 mm |
|---|---|---|---|---|
| Error of the focal length | 0.2960% | | 0% | 0% |
| Δfb after the adjustment | 0 mm | | 0 mm | 0 mm |

In the case where the ff adjustment is conducted for each focal length:

| Error Δd | 0 mm | 0 mm | 0 mm |
|---|---|---|---|
| Error of the focal length | 0% | 0% | 0% |
| Δfb after the adjustment | 0 mm | 0 mm | 0 mm |
| In the present invention: | W | M2 | T |
| Correction Δd | −0.032 mm | 0 mm | 0 mm |
| Error Δd | −0.032 mm | 0 mm | 0 mm |
| Error of the focal length | 0.203% | 0% | 0% |
| Δfb after the adjustment | 0 mm | 0 mm | 0 mm |

6. The focal position adjustment is conducted on a lens unit in which the FC lens group has an error of 0.1 mm in the forward direction, only at the telescopic angle end.

| Before adjustment: | W | M2 | T |
|---|---|---|---|
| Δfb | 0 mm | 0.mm | 0.1 mm |
| Error of the focal length | 0% | 0% | 0% |
| In the conventional case: | | | |
| an FC adjustment amount | −0.0178 mm | | |
| an ff adjustment amount | 0.0384 mm | | |
| Error Δd | −0.018 mm | −0.018 mm | −0.018 mm |
| Error of the focal length | 0.114% | 0.172% | 0.214% |
| Δfb after the adjustment | 0 mm | −0.046 mm | 0 mm |

In the case where the FC adjustment is conducted for each focal length:

| Error Δd | 0 mm | 0 mm | −0 013 mm |
|---|---|---|---|
| Error of the focal length | 0% | 0% | 0 155% |
| Δfb after the adjustment | 0 mm | 0 mm | 0 mm |

In the case where the ff adjustment is conducted for each focal length:

| Error Δd | 0. mm | 0 mm | 0 mm |
|---|---|---|---|
| Error of the focal length | −0.640% | 0% | 0% |
| Δfb after the adjustment | 0 mm | 0 mm | 0 mm |
| In the present invention: | W | M2 | T |
| Correction Δd | 0 mm | 0 mm | −0.011 mm |
| Error Δd | 0 mm | 0 mm | −0 011 mm |
| Error of the focal length | 0% | 0% | 0.137% |
| Δfb after the adjustment | 0 mm | 0 mm | 0 mm |

7. In the case where the focal position adjustment is conducted on a unit in which the whole lens groups have an error of 0.1 mm in the forward direction under the condition that the FC lens group has an error of 0.1 mm in the forward direction:

(ΔFC=0.1 mm, Δff=0.1 mm)

| Before adjustment | W | M2 | T |
|---|---|---|---|
| Δfb | 0.316 mm | 0.574 mm | 0.879 mm |
| Error of the focal length | −0.640% | −0.9670% | −1.204% |

In the conventional case:

the focal position adjustment amount is perfectly corrected with an FC adjustment amount of −0.1 mm, and an ff adjustment amount of −0.1 mm. (FC adjustment, ff adjustment)

| Error Δd | 0 mm | 0 mm | 0 mm |
|---|---|---|---|
| Error of the focal length | 0% | 0% | 0% |
| Δfb after the adjustment | 0 mm | 0 mm | 0 mm |

In the case where the FC adjustment is conducted for each focal length:

| Correction Δd | −0.146 mm | −0.121 mm | −0.113 mm |
|---|---|---|---|
| Error Δd | −0.046 mm | −0.0210 mm | −0.013 mm |
| Error of the focal length | 0.296% | 0.204% | 0.155% |
| Δfb after the adjustment | 0 mm | 0 mm | 0 mm |

In the case where the ff adjustment is conducted for each focal length:

| Error Δd | 0.1 mm | 0.1 mm | 0.1 mm |
|---|---|---|---|
| Error of the focal length | −0.640% | −0.967% | −1.204% |
| Δfb after the adjustment | 0 mm | 0 mm | 0 mm |
| In the present invention: | W | M2 | T |
| Correction Δd | −0.1 mm | −0.1 mm | −0.1 mm |
| Error Δd | 0 mm | 0 mm | 0 mm |
| Error of the focal length | 0% | 0% | 0% |
| Δfb after the adjustment | 0 mm | 0 mm | 0 mm |

8. In the case where the focal position adjustment is conducted on a unit in which the whole lens groups have an error of 0.1 mm in the forward direction under the condition that the FC lens group has an error of 0.1 mm in the forward direction only at the telescopic end:

(ΔFC at the telescopic end=0.1 mm, Δff=0.1 mm)

| Before adjustment: | W | M2 | T |
|---|---|---|---|
| Δfb | 0.1 mm | 0.1 mm | 0.879 mm |
| Error of the focal length | 0% | 0% | 1.204% |
| In the conventional case: | | | |
| an FC adjustment amount: | −0.1384 mm | | |
| an ff adjustment amount: | 0.1989 mm. | | |
| Error Δd | −0.138 mm | −0.138 mm | −0.038 mm |
| Error of the focal length | 0.886% | 1.388% | 0.462% |
| Δfb after the adjustment | 0 mm | −0.357 mm | 0 mm |

In the case where the FC adjustment is conducted for each focal length:

| Error Δd | −0.046 mm | −0.021 mm | −0.013 mm |
|---|---|---|---|
| Error of the focal length | 0.296% | 0.204% | 0.155% |
| Δfb after the adjustment | 0 mm | 0 mm | 0 mm |

In the case where the ff adjustment is conducted for each focal length:

| Error Δd | 0 mm | 0 mm | 0.1 mm |
|---|---|---|---|
| Error of the focal length | 0% | 0% | −1.204% |
| Δfb after the adjustment | 0 mm | 0 mm | 0 mm |
| In the present invention: | W | M2 | T |
| Correction Δd | −0.032 mm | −0.017 mm | −0.1 mm |
| Error Δd | −0.032 mm | −0.017 mm | 0 mm |
| Error of the focal length | 0.203% | 0.169% | 0% |
| Δfb after the adjustment | 0 mm | 0 mm | 0 mm |

In the foregoing conventional method, errors of the lens distance and the position of the whole lens groups can be accurately corrected. However, in the case where there are errors in the zoom lens due to cams or the like, sufficient focusing can not be obtained in the center range of the zoom lens, and further, when the focusing operation is conducted, the error of the focal length is increased. (Examples 3, 4, 5, 6, and 8)

These errors are improved when focal position adjustment is conducted for each focal length. When an ff adjustment is conducted for each focal length, the adjustment amount in the telescopic range is large, the error of the focal length due to the error of the distance between the lenses is not improved. In a mechanical view, it is difficult that the ff adjustment is conducted for each focal length. (Examples 1, 3, 4, 7 and 8)

When the FC adjustment is conducted for each focal length, the error is decreased, compared to the ff adjustment. However, when errors exist in the whole lens groups at the wide angle range, the errors can be significant, so that improvement is necessary. (Examples 2, 5, 6, 7 and 8).

Due to the foregoing, the FC adjustment is advantageous in the telescopic range, but the positional errors of the whole lens groups remain in the wide angle range when only FC adjustment is conducted.

The twin-focus type lens adjustment method can have an effect of the FC adjustment and the effect of the ff adjustment. This method is more improved than the FC adjustment method simply in absorption of the positional errors of the whole lens groups. This can be confirmed by the following equation.

FC adjustment: Δd=Δfb/G

Twin-focus adjustment: Δd=Δfb/(G+1)

(Twin-focus ratio $FD_S$: $RC_S$=2:1)

When, simply, Δfb is caused by the overall error of the lens group, it is found that the error of the distance between lenses of the twin-focus adjustment is decreased. Further, it is also found that the effect is increased in the wide range in which the sensitivity for errors is low, and that disadvantages of the FC adjustment are improved. Further, as shown in Example 7, when ΔFC and Δff occur simultaneously, the twin-focus type adjustment has the same effect as that in the zoom lens in which the conventional FC and ff adjustments are conducted.

Next, a region is checked in which the focal length error of the twin-focus type adjustment is smaller than that of the FC adjustment.

The error Δd after the FC adjustment is:

$$\Delta d = \Delta FC - (\Delta FC \times G + \Delta ff)/G = -\Delta ff/G \qquad (4)$$

The error Δd after the twin-focus adjustment is:

$$\Delta d = \Delta FC - (\Delta FC \times G + \Delta ff)/(G+1) = (\Delta FC - \Delta ff)/(G+1) \qquad (5)$$

A region, in which the error of the twin-focus adjustment is smaller than that of the FC adjustment, is:
In the case of ΔFC/Δff >0 ;

| Δff/G > (ΔFC − Δff)/(G+1)     (6) |
|---|
| (G+1)/G > (ΔFC − Δff)/Δff |
| (G+1)/G > ΔFC/Δff − 1 |
| (G+1)/G + 1 > ΔFC/Δff |
| (2 × G + 1)/G > ΔFC/Δff |

In the case of G=2.16 (wide) 2.46

In the case of G=7.79 (telescopic) 2.13

In the case of $\Delta FC/\Delta ff < 0$

---

$-\Delta ff/G > (\Delta FC - \Delta ff)/(G+1)$  (7)
$-\Delta ff \times (G+1) > (\Delta FC - \Delta ff) \times G$
$-\Delta ff \times G - \Delta ff > \Delta FC \times G - \Delta ff \times G$
$-\Delta ff > \Delta FC \times G$
$1/G < -\Delta FC/\Delta ff$

---

In the case of G=2.16 (wide) −0.46

In the case of G=7.79 (telescopic) −0.128

When equations ⑥ and ⑦ are satisfied, the focal length error of the twin-focus adjustment is smaller than that of the FC adjustment (in the case where the twin focus ratio $FC_S:RC_S=2:1$)

In the case where the focal length error can be significant other than in the aforementioned region, the focal length error can be corrected when the FC adjustment is conducted at the time when an FC lens frame is mounted on an FC sliding frame, as in the present invention. Further, in this adjustment operation, an optimum $\Delta FC/\Delta ff$ ratio can be selected.

(In the case where the movement ratio of $FD_S:RC_S=2:1$, the optimum ratio is 1)

Further, in the present invention, when the helicoid ratio of the inside and outside of the cam barrel is changed, the ratio of $FC_S:RC_S$ can be changed. Accordingly, the region, in which sufficient focusing effect is obtained, can be changed.

As described above, it can be noted that problems due to the FC and ff adjustments conducted in the conventional zoom barrel, can be solved when the focal length is adjusted stepwise in the focal position adjustment of the zoom lens. Further, it can be noted that the FC adjustment is suitable for the adjustment of each focal length, and that the FC adjustment can be improved by the present invention.

In the conventional FC adjustment method, since the distance between the front lens and the diaphragm is changed by the FC adjustment, the diaphragm can not be positioned at an ideal position. Further, it is necessary that dead space is provided between the front lens and the diaphragm because of the FC adjustment amount. Furthermore, in the ff adjustment, a large adjusting mechanism other than the zoom driving system is required in order to move the overall zoom barrel, and to support it.

As described above, since the zoom lens is adjusted for each focal length only by an amount of rotation of the motor (the rotation angle of the cam barrel) in the twin-focus type zoom lens barrel, the FC and ff adjustment mechanism can be eliminated, factors of lens positional errors due to these mechanism are eliminated, and the rigidity and operability are improved, and space which are provided for these mechanism can be greatly reduced. Due to the twin-focus system, not only the accuracy of focal position adjustment, the accuracy of parts, and the operability of the lens barrel are improved, but also the zoom lens barrel can be made more compact, and the cost can be lowered further. Further, as compared with conventional zoom mechanisms, since the lens barrel of the present invention is simplified, and has no exclusive focusing mechanism, the positional error of lens can be drastically decreased. Errors of the focal length in the focal position adjustment can be compatible with the lens characteristics and the system of the camera when the movement ratio of the FC and RC are changed.

[The improvement of the lens performance when protruded]

Next, the influence of the twin-focus system on the lens performance will be described below.

Initially, the influence on the lens performance when the zoom lens is protruded, is compared with each focusing system. The overall protrusion system is adopted by a single focal point lens camera in many cases. The front lens focusing system is adopted by a telephoto type two-group zoom lens in many cases. The twin-focus system, according to the present invention, and the foregoing two systems are compared with each other, when these three systems are adopted into the telephoto type two-group zoom lens, in the following table.

TABLE 1

|  | Overall protrusion | Front lens focusing | Present invention |
|---|---|---|---|
| Amount of protrusion | different for each focal length | constant for each focal length | different for each focal length |
| Front lens movement amount | large | small | middle |
| Angle of view | narrow | slightly broader | slightly narrower |
| Image plane illuminance | dark | slightly brighter | slightly darker |
| Amount of peripheral light | increased | decreased | middle |
| Distortion | good | no good | middle |

Note:

(1) In the case of the twin-focus ratio $FD_S:RC_S=2:1$ (2) When the focusing control is conducted by the overall protrusion in the telescopic range of the zoom lens, the focusing movement amount is more than 10 mm in the case where the photographic distance is 0.6 m at the focal length of 70 mm, and the overall length of the lens barrel becomes excessively long, which is incompatible with compactness.

As described above, in the present invention, the all characteristics are desirable except that the protrusion amount is different for each focal length.

When the step zoom lens barrel is provided, since there are several driving portions for focusing, the difference of the mechanical protrusion is generated for each focal length. Accordingly, the characteristic, in which the protrusion amount is constant at every focal length in the conventional zoom lens, has no meaning in the case of the step zoom lens barrel.

In the mechanism which was previously explained in the present invention, since the distance between the front lens and the diaphragm is not changed when the lenses are protruded, the phenomena does not occur in which the peripheral light flux, generated at the time of the lens protrusion, is cut.

At the time of the lens protrusion, the small change of the angle of view is advantageous in the field ratio of the view finder. When the illuminance of the image surface is approximately constant, the difference of the exposure due to the lens protrusion is smaller. When the deterioration of the image due to the lens protrusion is improved, the closest object distance, at which photographing can be carried out, can be set at a nearer position, which is desirable for use of the camera.

It is found that the influence on the lens performance at the time of the lens protrusion can be improved by the twin-focus system.

[The equation by which the effect of the twin-focus is explained]

1. Sensitivity for errors $$G = \Delta fb/\Delta d = (f/f1)^2$$

Where,

G: sensitivity for errors $\Delta d$: the changed amount of the distance between lenses $\Delta fb$: the changed amount of the focal position f1: the focal length of the first lens group (FC lens group)

f: the synthetic focal length (the focal length of the zoom lens system)

Note: A value of the sensitivity for errors is larger as the focal length of the first lens group becomes shorter, and the value of the sensitivity for errors is larger as the synthetic focal length is longer.

It is defined that the movement in the direction of the object is the 'positive' direction.

2: The changed amount of the focal position $$\Delta fb = (FC_S - RC_S) \times G + RC_S$$

Where, $\Delta fb$: the movement amount of the focal point $FC_S$: the movement amount of the FC lens $RC_S$: the movement amount of the RC lens Note: When the movement amount of the RC lens is increased, the movement amount of the FC lens is also increased.

3. The synthetic focal length $$1/f = (1/f1) + (1/f2) - \{H/(f1 \cdot f2)\}$$

Where,

H: the distance between principal points between the first lens group and the second lens group f1: the focal length of the first lens group (FC lens group)

f2: the focal length of the second lens group (RC lens group)

Note: When the FC lens (+) is longer, the synthetic focal length is also longer.

When the RC lens (−) is longer, the synthetic focal length is shorter.

When the distance between the lenses is longer, the synthetic focal length is shorter.

4. An amount of protrusion (the overall protrusion type)

$$x = [R - 2 \cdot f - H - \{(R-H)(R-H-4f)\}^{1/2}]/2$$

The above equation approximates the following equation.

$$x = f^2/(R - 2 \cdot f)$$

Where, x: an amount of lens protrusion f: the focal length

R: the object distance

H: the distance between principal points.

Note: When the focal length is longer, the amount of protrusion is larger.

When the object distance is smaller, the amount of protrusion is larger.

5. The amount of protrusion (the FC protrusion type)

When it is considered that the focal point is made to be constant by the FC protrusion, that is, the overall protrusion is carried out by the FC protrusion, $$x = f1^2/(R - 2 \cdot f1)$$

$$\begin{aligned}
1/fx &= (1/f1) + (1/f2) - \{(d+x)/(f1 \cdot f2)\} \\
&= 1/f0 - f1^2/\{(R - 2 \cdot f1) \times (f1 \cdot f2)\} \\
&= 1/f0 - f1/\{(R - 2 \cdot f1) \times f2\}
\end{aligned}$$

Where, x: the amount of protrusion f1: the focal length of the FC lens

R: the subject distance f0: the focal length before protrusion (at the ∞ position)

fx: the focal length after protrusion (at the ∞ position)

6. The maximum angle of view $$\theta = \tan^{-1}\{\text{the diagonal length}/2/(\text{the focal length} + \text{the amount of protrusion})\} \times 2$$

Note: When the focal length is shorter by the protruded amount, the constant angle of view can be obtained.

In the zoom lens, when an amount of a change of the focal length at the time of protrusion is decreased, the constant angle of view can be obtained.

7. Protrusion at the constant angle of view

From the equation of the protrusion amount: $X = f^2/(R - 2 \cdot f)$, the following equation is obtained.

When the following presuppositions are used:

f0: the focal length before protrusion (at the ∞ position)

fx: the focal length after protrusion (at the ∞ position)

x: a protruded amount of fx $$f0 = fx + x,$$

$$fx = [(R + 2 \cdot f0) - \{(R + 2 \cdot f0)^2 - 4 f0 R\}^{1/2}]/2$$

8. The angle of view when the zoom lens is protruded

The change of the focal length by the protrusion of the FC lens, is obtained from item 5 as follows;

$$1/fx = 1/f0 - f1/\{(R - 2 \cdot f1) \times f2\}$$

The focal length at the constant angle of view is obtained from item 7 as follows;

$$fx = [(R + 2 \cdot f0) - \{(R + 2 \cdot f0)^2 - 4 f0 \cdot R\}^{1/2}]/2$$

When numeric values are substituted into the above two equations, the focal length by the FC protrusion is shorter than the focal length at the constant angle of view.

f1 = 24.5 mm f2 = −22.5 mm the focal length in the wide angle range: 36.03 mm the focal length in the telescopic angle range: 60.35 mm When the zoom lens protrusion is carried out by the FC protrusion for the subject distance of 0.9 m in the wide angle range, and for the subject distance of 0.6 m in the telescopic range, the focal length in the case of 0.9 m in the wide angle range is 34.44 mm, the focal length in the case of 0.6 m in the telescopic angle range is 60.35 mm.

The focal length, by which the constant angle of view is maintained, is:

34.59 mm in the case of 0.9 m in the wide angle range, and 60.80 mm in the case of 0.6 m in the telescopic angle range.

Accordingly, when the zoom lens is protruded by the FC protrusion, the angle of view is broader.

(A) the distance of the focal point at the time of the overall protrusion (the focal length+the amount of protrusion):

37.60 mm in the case of 0.9 m in the wide angle range, 78.67 mm in the case of 0.6 m in the telescopic angle range.

(B) When twin-focusing is conducted under the condition that $FC_S:RC_S$ is 2:1, and the following values are substituted into the equation of the amount of change of the focal point and the equation of twin-focus ratio:

the distance of the principal point in the wide angle range=18.28 mm, the distance of the principal point in the telescopic angle range=11.03 mm, the sensitivity for errors in the wide angle range of 2.16 times, the sensitivity for errors in the telescopic angle range of 7.79 times, then the following results are obtained:

$$\Delta fb = (FC_S - RC_S) \times G + RC_S$$

$$FC_S - RC_S = RC_S$$

the difference between lenses=G/(G+1).

When the FC protrusion amount is changed to the amount of 2.16/3.16 in the wide angle range, and to the amount of 7.79/8.79 in the telescopic angle range, and when the second term of the right hand side of the following equation expresses the above ratios;

$$1/fx = 1/f0 - f1/\{(R-2 \cdot f1) \times f2\},$$

then, the following results are obtained;

the focal length for 0.9 m in the wide angle range is 34.93 mm;

and the focal length for 0.6 m in the telescopic angle range is 61.19 mm.

Due to the foregoing, it can be found that the change of angle of view at the time of the protrusion by the twin-focus system with 2 versus 1, becomes slightly narrower. In the present invention, the method, by which the angle of view becomes slightly narrower, is adopted considering the amount of the peripheral light and the aberration of distortion.

9. Details of the image

The amount of the peripheral light $$E\theta = E0 \times (S\theta/S0) \times (\cos \theta)^4$$

Where,

θ: the angle of incidence

E0: the illumination on the optical axis

Eθ: the illumination of the focal point corresponding to the angle of incidence θ

S0: the area of the diaphragm in the front view of the lens

Sθ: the area of the diaphragm viewed from the direction of θ

Due to the foregoing, the broader the angle of view is, the lower the amount of the peripheral light is. Further, in the zoom lens, since the effective aperture of the lens is determined by a flux of light at the ∞ position of the wide angle end, the flux of peripheral light is prevented by the lens frame or the like when the angle of view is broadened.

Aberration of distortion

Generally, the aberration of distortion of the wide angle lens tends to increase. In the zoom lens, the wider the angle of view of the zoom lens is, the more distortion aberration is increased, in many cases.

When the angle of view becomes broader by the lens protrusion, the aberration of distortion is increased.

[Structure]

Referring to FIGS. 1 to 4, the structure of the present invention will be described in detail.

Figure 2:
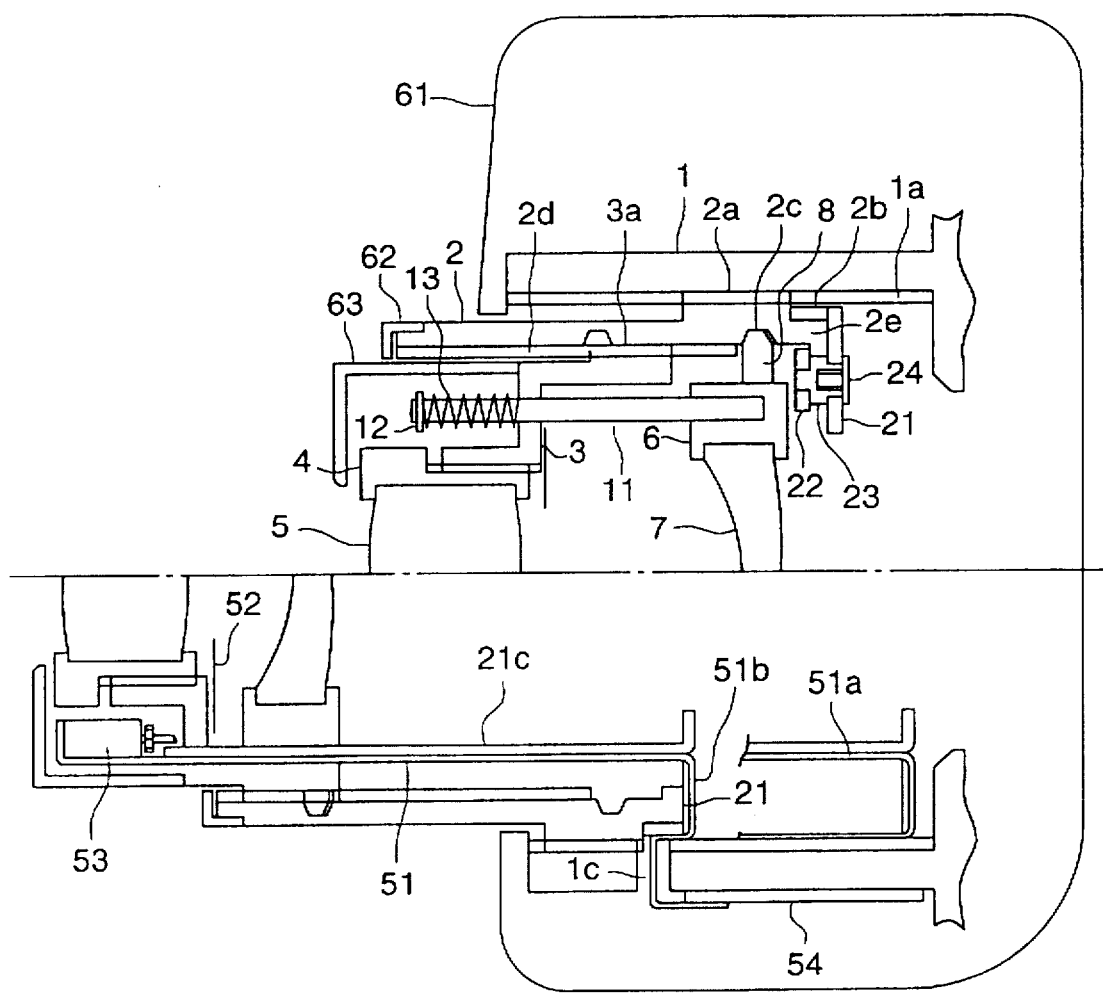
FIG. 2 is a horizontal sectional view of the zoom lens barrel.
Figure 3:
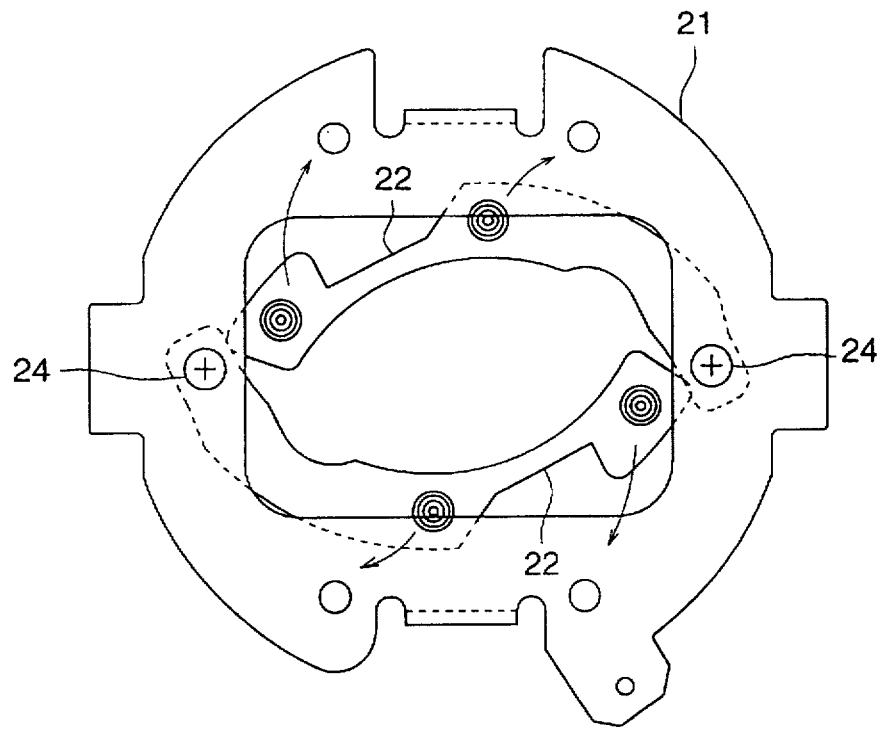
FIGS. 3A and 3B are an illustration of an assembly of a fixed plate.
Figure 3:
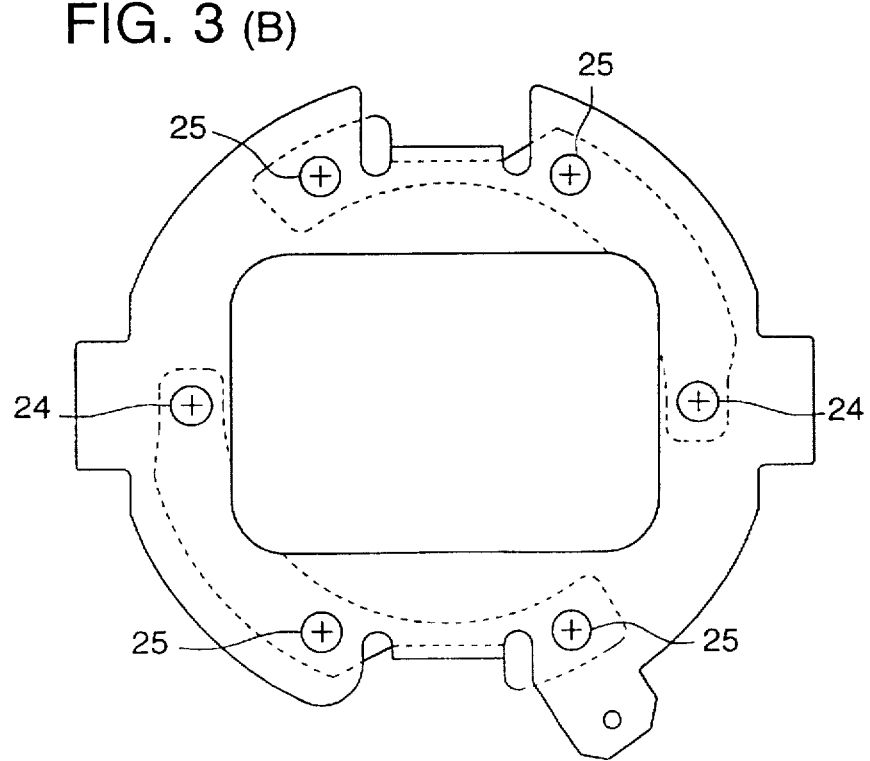
Figure 4:
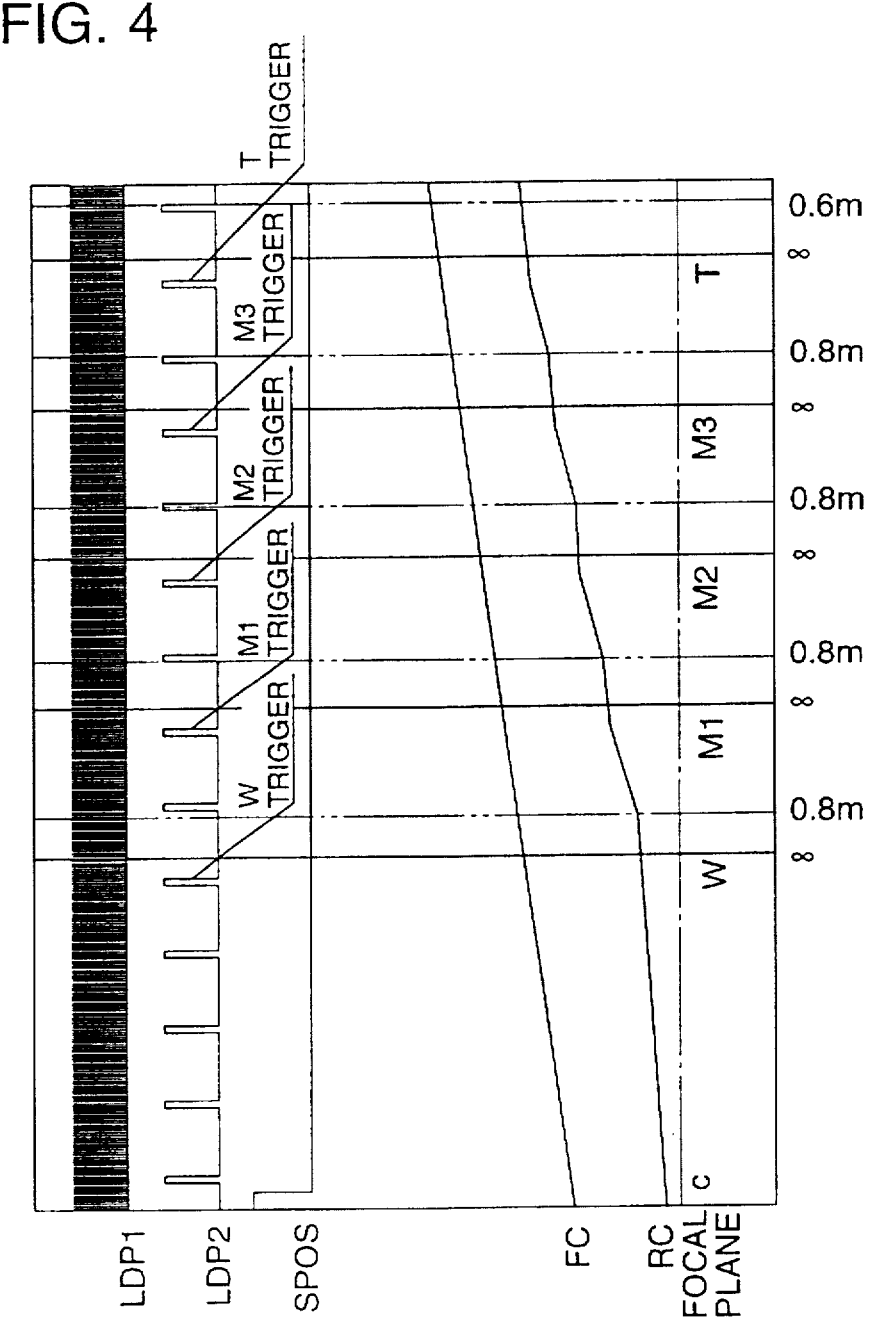
FIG. 4 is a diagram of a step zooming operation.

FIG. 1 is an exploded perspective view of the zoom lens barrel according to the present invention. FIG. 2 is a cross sectional view of the zoom lens barrel. In FIG. 2, the focal point is set in the wide angle range in the upper half of the zoom lens barrel, and the focal point is set in the telescopic angle range in the lower half of the zoom lens barrel. FIG. 3 is an illustration showing assembly of the fixed plate. FIG. 4 is a zooming diagram of the zoom lens.

Numeral 1 is a fixed barrel which is integrally fixed to the camera body, and a female helicoid 1a is provided on the inner periphery of the fixed barrel. Guide slots 1b for a straight guide 21, which will be described later, are provided across the female helicoid 1a at the left and right portions of the female helicoid 1a. Numeral 2 is a cam barrel. A male helicoid 2a, which is screwed on the female helicoid 1a, is integrally formed with a large gear 2b on the outer periphery of the cam barrel. Further, a female helicoid 2c and a cam groove 2d (inner cam) are provided on the inner periphery of the cam barrel 2, and a rib 2e is provided at the back edge portion in the cam barrel in the direction toward the inside of the camera. A tip circle of the large gear 2b is formed which is smaller than a minor diameter of the male helicoid 2a, which contributes to down-sizing of the lens barrel. In the case where the cam barrel 2 is integrally molded with the large gear 2b, when the large gear 2b is positioned on the back end surface of the cam barrel 2, molding can be carried out by a single-unit type mold in the direction of travel, without splitting the forming mold, so that highly accurate parts can be produced by a simple structured mold. Numeral 3 is an FC sliding frame, and an FC lens mirror frame 4, holding an FC lens 5, in which the synthetic focal length is (+), is fixed to the FC sliding frame from the front with screws. The dimensional error of production for parts of the lens system is adjusted when the screw positions are changed. Basically, this position adjustment is the same as the FC adjustment. However, it is not necessary that the FC adjustment, which is used for the individual adjustment, is carried out. A male helicoid 3a, which is screwed on the female helicoid 2c, and a guide slot 3b for the straight guide 21, which will be described later, are provided on the outer periphery of the FC sliding frame 3, and a hole 3c for a guide shaft 11, which will be described later, is also provided thereon. Numeral 6 is an RC sliding frame, which holds an RC lens 7 by the inner periphery of the sliding frame. The synthetic focal length of the RC lens 7 is (−). On the outer periphery of the sliding frame, a guide slot 6a for the straight guide 21 is provided, and an RC cam pin 8, which is engaged with the cam groove 2d, is also provided. A guide shaft 11 protrudes from the outer periphery of the sliding frame 6. Numeral 13 is a shaft spring which is inserted into the guide shaft 11. Numeral 12 is an E-ring to prevent a shaft spring 13 from coming off the shaft. Numeral 21 is a straight guide, protrusions 21a of which slide in the guide slots 1b of the fixed barrel 1. Protrusions 21a protrude from the left and right sides of the straight guide 21. A driving gear 44, which will be described later, is rotatably supported by another protrusion 21b. Arm portions 21c, which are bent in the forward direction, slide in guide slots 3b and guide slots 6a. Numeral 22 is a guiding fixed-plate, by which the cam barrel 2 is connected to the straight guide 21. Numeral 23 is a guiding fixed-shaft by which the straight guide 21 is connected with the guiding fixed-plate 22, and the cam barrel 2 is held at a rib 2e. Numeral 24 is a set screw by which the straight guide 21 is fixed to the guiding fixed-shaft 23.

Numeral 31 is a barrel driving motor. A propeller 33 for LDP1, which will be described later, is mounted on a shaft 32 of the motor. The propeller 33 is used for generating a signal LDP1 by a photointerrupter 34 for LDP1. Numeral 35 is a pinion which is directly connected to the motor. The rotation of the motor 31 is transmitted to the fifth gear 43, the shape of which is long in the direction of the optical axis, through the first gear 36, the second gear 37, the third gear 38 and the fourth gear 42, and further transmitted to a driving gear 44. The driving gear 44 is engaged with the large gear 2b of the cam barrel 2. A propeller 40 for LDP1 is mounted on a shaft 39 of the third gear 38, and generates a signal LDP2 by a photointerrupter 41 for LDP2.

Numeral 52 is a shutter, and numeral 53 is a shutter driving motor, which are mounted on the FC sliding frame 3. Numeral 51 is an FPC board, through which the shutter driving motor 53 is connected to a printed circuit board 54 on which electric components of the main body are mounted. After the FPC board 51 is connected to the shutter driving motor 53, the FPC board 51 passes through a gap formed between the arm portion 21c of the straight guide 21 and the inner periphery of the cam barrel 2 in the backward direction of the camera. Then, the direction of the advance of the FPC board 51 is changed to the forward direction of the camera, and the FPC board 51 passes through a gap formed between the outer periphery of the cam barrel 2 and the fixed barrel 1. A hole 1c is provided in the fixed barrel 1 in the front direction of the camera at the back end 2f of the cam barrel 2, at which the cam barrel 2 is protruded to the maximum. The FPC board 51 passes through the hole 1c, and is withdrawn on the outer periphery of the fixed barrel 1. The FPC barrel 51 is connected to the printed circuit board 54 of the main body. In this context, numeral 51a shows the FPC board 51 at the position in which the lens barrel is most retracted. Numeral 61 is the outer shape of the camera. A decorative ring 62 is mounted on the cam barrel 2, and a front barrel 63 is mounted on the FC sliding frame 3.

Next, basic operations of the zoom lens barrel will be described.

Initially, when the driving motor 31 is rotated, the driving force of the motor is transmitted through a gear train 36, 37, 38, and 42 to the fifth gear 43. The driving force is transmitted through the fifth gear 43 to the driving gear 44 which is mounted on the straight guide 21. The driving gear 44 is engaged with the large gear 2b, and rotates the cam barrel 2. The driving gear 44 moves the cam barrel 2, which is helicoidally engaged with the fixed barrel 1, in the direction of the optical axis. At this time, the cam barrel 2 moves forward or backward in the direction of the optical axis depending on the rotational direction of the driving motor 31. The straight guide 21 is integrally provided with the rib 2e of the cam barrel 2 by the guiding fixed-plate 22, the guiding fixed-shaft 23, and the screw 24. The rotation of the straight guide 21 is interrupted by the left and right protrusions 21a and the guide slot 1b of the fixed barrel 1. The straight guide 21 only moves in the direction of the optical axis. In the same way as the foregoing, the rotation of the FC sliding frame 3 is interrupted at the guide slot 3b by the straight guide 21. Further, since the guide shaft 11 protruding from the RC sliding frame 6 passes through the FC sliding frame 3, the rotation of both the RC sliding frame 6 and the FC sliding frame 3 are interrupted. Accordingly, when the cam barrel 2 is rotated and moved, the FC sliding frame 3, which is helicoidally connected to the cam barrel 2, and the RC sliding frame 6, which is cam-connected to the cam barrel 2, are only moved forward or backward in the direction of the optical axis. The FC sliding frame 3 moves at a ratio of 2 times of the distance which the cam barrel moves. This ratio is determined by leads of the inner helicoid and the outer helicoid of the cam barrel. In this embodiment, since approximately the same leads are provided, the movement ratio is the above described ratio. The engaged position of the fifth gear 43 with the driving gear 44 is changed in the direction of the optical axis accompanied with the movement of the cam barrel 2. However, since the fifth gear 43 is an elongated gear in which long teeth are provided in the direction of the optical axis, the engagement of the gears is always maintained, in spite of the movement of the cam barrel. The rib 2e of the cam barrel 2 is provided to prevent the straight guide 21 from being disengaged from this assembly. The inner surface of the rib 2e forms a bearing surface by which the rotation of the cam barrel is supported, and prevents the cam barrel 2 from being deformed at the time of driving force transmission.

The RC sliding frame 6 holding the RC lens 7, is driven by the cam groove 2d as described above, and the shape of the cam is divided into two regions, a focusing region and a focal length switching region, so that the focusing operation and the focal length switching operation can be carried out by the same driving means. In this embodiment, 5 focal lengths are selected as shown in FIGS. 3(A) and 3(B). However, in order to have an adjustment margin in the focusing operation, the shape of cams in the focusing region are respectively set in the manner that the cam shapes are longer than the distance from the theoretically infinite position to the closest distance position. Although the relative distance of the RC sliding frame 6 to the cam barrel 2 is not changed in the focusing region and the retractable operation region, (the RC sliding frame 6 moves at approximately ½ of the ratio of the FC lens 5, when viewed from the focal plane), the RC sliding frame 6 has an inclination characteristic in which the RC sliding frame moves at a higher ratio than the FC lens 5 in the zooming region when viewed from the focal plane. The FC lens 5 always moves linearly with respect to the rotation of the motor. The RC lens 7 moves linearly with respect to the rotation angle of the motor 31 in both the focusing region and the focal length switching region, however, the inclination characteristic of the RC lens 7 is different depending on each region. The shape of the connecting portion of the cam portion, by which the focusing region is connected to the focal length switching region, is nonlinear, that is, arc-shaped. Accordingly, the operability of the RC lens 7 is increased, and it is difficult to add the force in the radial direction to the RC lens 7. The inclination characteristics of 4 focal length switching regions between focusing regions are not the same. The relative movement of the lenses is described as follows: when focusing is conducted at a near distance, being switched from the infinite distance, the FC lens 5 and the RC lens 7 are separated from each other and both are separated from the focal plane; and when the focal length is switched from the wide angle range to the telescopic angle range, the FC lens 5 and the RC lens 7 approach each other, and are separated from the focal plane.

The guide shaft 11 protruded from the RC sliding frame 6 penetrates the FC sliding frame 3, and the compressed shaft spring 13 is held by the E-ring at the front end of the guide shaft 11. Accordingly, the RC sliding frame 6 is always pulled in the direction of the FC sliding frame 3 by the spring force. Therefore, only one surface of the cam of the cam groove 2d of the cam barrel 2 is used. Accordingly, the width of the cam groove is larger than that of the cam pin, and is sufficient for the operation of the cam pin. A rise angle of the cam groove is asymmetrical at the nearest side and at the opposite side in the manner that the rise angle of the cam groove is increased as large as possible at the nearest side so that the operational efficiency of the cam groove is increased. Plastic molding of this cam can be easily carried out. When the focusing operation is carried out, the RC sliding frame 6 is moved in the direction in which the spring force applied to the RC sliding frame is increased. When the focal length is switched, the RC sliding frame 6 is moved in the direction in which the spring force applied to the RC sliding frame is decreased. The cam groove 2d is opened in the forward direction of the optical axis. When the RC sliding frame 6 is assembled into the cam barrel 2, it is assembled from the front of the cam barrel 2. This RC sliding frame 6 is connected to the FC sliding frame 3 (including the shutter 52 and the like) by the guide shaft 11. Accordingly, the FC, and RC sliding frames are assembled into the cam groove in a unit. In this case, when the RC sliding frame 6 is pulled to the FC sliding frame 3 side, the good assembling operability is obtained.

Normally, the lens performance, such as the resolving power for projection, is checked at the inspection step of the cam barrel unit including FC and RC sliding frame unit. However, when the cam barrel provided on the outer surface of the cam barrel unit is rotated, both the focal length selection and the focal position adjustment can be carried out, so that the efficiency of the inspection is very high, and large electric tools are not necessary. When the lens performance, such as the resolving power for projection, is inspected under this condition, defects can be easily detected, and the overhaul/repair time and cost can be greatly reduced. It is not necessary that the shutter driving portion, FPC, and lens cover are assembled in this unit, and further the focusing mechanism need not be assembled in this unit. Accordingly, replacement of a defective FC lens can be easily carried out.

After the cam barrel unit has been housed in the fixed barrel 1, the straight guide 21 is installed, and the two fixed plates 22 to support the straight guide 21 are installed. These assembling operations are explained below, referring to FIGS. 3(A) and 3(B). In FIG. 3(A), in order to increase the assembling operability, two temporary fixed plates 22 are fixed to the straight guide 21 respectively by screws 24. After the straight guide 21 has been installed in the cam barrel 2 from the back of the camera, the two fixed plates 22 are rotated clockwise around the screws 24, and screwed onto the straight guide 21 at 6 positions by the screws 24 and screws 25, as shown in FIG. 3(B). As described above, the straight guide 21 can linearly guide the fixed barrel 1 and the FC sliding frame 3 by a single part. Accordingly, the FC sliding frame 3 can be very accurately moved linearly, and resulting in high efficiency of the driving force for the linear movement.

The cam barrel 2 is synchronously moved with the straight guide 21 in the direction of the optical axis. A driving gear 44 is mounted on the straight guide 21. Accordingly, even when the cam barrel 2 moves in the direction of the optical axis, the position in the direction of the optical axis with respect to the driving gear is not changed. Therefore, the shape of the large gear 2b provided on the cam barrel 2 is a simple structure so that the width of the teeth of the large gear 2b is limited to a predetermined value, and projects from the back end of the cam barrel. This is done from the reason that the dimension of the large gear in the direction of the optical axis is reduced to be as small as possible. When the shape of the gear on the cam barrel is helicoidal, or that gear is replaced by several gears, an intermediate driving gear is not necessary. This gear, which is long in the direction of the optical axis, can reduce the number of gears, however, the length of the gear in the direction of the optical axis is long on the cam barrel. When the length of the gear on the cam barrel in the direction of the optical axis is long, a large retractable amount of the lens barrel can not be obtained since this gear appears on the exterior of the camera. When the rotation angle of the gear is small, the dimension of the gear in the direction of the optical axis can be smaller. However, since the lens barrel is moved in the forward direction or rearward direction by a small rotation angle, the lead of the helicoid, and the lead of the cam are extended, so that the backlash in the direction of the optical axis is increased and the focusing accuracy is adversely affected. Further, since the driving force for moving the lens barrel is increased, large deformation occurs in a plastic lens barrel when the driving force is transmitted. Further, when the gear is replaced by several gears, a large rotation angle can be obtained. However, in this case, when the size of the gears are different, not only does transmission loss occur, but also the number of split of the mold is increased even when the gears are integrally plastic-molded. Accordingly, in order to obtain a suitable gear shape, high accuracy and high cost are necessary. When the gear, which is long in the direction of the optical axis, is used for transmitting the driving force, since the diameter of the root circle of the gear of the cam barrel is larger than the diameter of the tip of the helicoid, the diameter of the gear portion on the cam barrel is larger than that of the helicoid portion, and its surrounding members, such as the fixed barrel, become large, then the lens barrel becomes correspondingly large.

As described above, according to the movable gear system of the present invention, a large retractable amount of the lens barrel can be obtained, the rotation angle of the cam barrel is large, and the outer diameter of the lens barrel can be decreased. Further, when the gear portion is located outside the surface of the back end of the cam barrel, and not only the structure of the mold is simplified, but also when the rib is provided inside the cam barrel, sufficient bottom thickness of the gear can be obtained, and when the rib is so supported, the deformation of the cam barrel at the time of driving force transmission can be prevented at every rotational position.

As shown in FIG. 4, three signals, that is, the continuous pulse signal LDP1 in which the rotation of the driving motor 31 is detected by a photointerrupter 34, the intermittent pulse LDP2 in which the rotation of the third gear in the gear train is detected by the photointerrupter 41, and the SPOS in which the position of the end of the retracted lens barrel is detected by a switch, not shown in the drawing, are used for the drive control. The focal length is divided in the manner that the difference of the distance between the ∞ focal position in the wide angle range and the ∞ focal position in the telescopic angle range, is divided into an integer (4-division). This is due to the reason that the focal length is controlled by the periodically generated signal LDP2, and the reason why a method, in which the LDP2 is generated by the periodical rotation mechanism, is small and of low cost, and further the method can be carried out without contact, as the method by which the focal length is selected for a predetermined rotation amount of the motor.

In other words, the intervals of the positions of the FC lens at the focal positions of the wide ∞, middle ∞, middle 2 ∞, middle 3 ∞, and tele ∞, are equal, and the rotation amount of the motor is the same. When the difference between the above-described positions is small, it is not necessary that the distance is equal. However, since the amount of an approach of the focusing operation is the same for each focal length, an inefficient focus time is prevented for each focal length. Further, setting of the allowable focal position adjustment amount is effective for each focal length.

The LDP2 for the focal length control is used as a trigger pulse when the count of the lens protruding pulses at the time of focusing is started. When the generation time of the LDP2 is mechanically changed, the focal position adjustment can be carried out. Specifically, when the propeller 40 for LDP2, the axle of which is lightly press-fit in the shaft 39 of the third gear 38, is slipped in the direction of the rotation, the position of generation of the LDP2 is changed. The space for adjustment is not necessary when the position of the propeller, which periodically generates the pulses, is changed. Accordingly, the focal position adjustment can be carried out without taking up additional space. This adjustment is carried out as the general focal position adjustment operation of the lens barrel unit before it is mounted to the main body, and the wide angle end with low sensitivity for error is adjusted at the ∞ focal length. After that, in the complete unit of the camera, the focal position adjustment is carried out for each focal length, and the deviation from the general adjustment, and the deviation for each focal length are stored in the EEP-ROM. The focal position adjustment is carried out when the generation time of the LDP2 is changed, or when pulses to be counted are corrected by a trigger signal. In both cases, the focal position adjustment is carried out by the rotation angle of the cam barrel.

Further, the LDP2 is also used as a trigger signal for the start of the stop control at the time of the focal length selection. Approximately 23 pulses are included in the width of the Hi-level of the LDP2, which is set in the manner that the number of pulses equals the total of the pulses, which are necessary in the case where the motor is controlled for stopping at the side of lens barrel protrusion, and pulses, which are necessary in the case where the motor is controlled for stopping at the side of lens barrel which is retracted. That is, the pulse width of LDP2=the width of ZOOM-UP stop pulses+the width of ZOOM-DOWN stop pulses.

According to this setting, even when the lens barrel stops from either direction, the lens barrel stops without fail at the position where LDP2 is Hi. Further, even when the lens barrel stops from either direction, the lens barrel stops at approximately the same position.

Also, when the zooming operation is carried out by pressing a button which is provided outside the camera, it is estimated when the LDP2 rises whether or not the control is shifted to the zoom stop control (at the time of ZOOM-DOWN, it is estimated when the LDP2 falls). Accordingly, since the estimation is carried out only when the LDP2 rises and is changed, the zoom button Sw, in which much chattering occurs, can be used. Further, even when the Sw is intermittently operated, the lens barrel can be correctly operated.

The zooming operation is carried out under the condition that the lens barrel stops at a specified position, in which the LDP2 is Hi, at every focal length when photographing is carried out. Accordingly, when the LDP2 is not Hi at the start of the focusing operation, it is judged that the lens barrel is erroneously operated from the outside (the cam barrel is manually rotated), and the lens barrel is moved to the initial position for initializing (SPOS signal).

Functions of the LDP2 are arranged as follows.

① The position control at the time of focal length selection (the relative number of pulses from the initial position)

② The stop control trigger signal at the time of focal length selection by the outside operation.

③ The protrusion count trigger signal at the time of focus control.

④ The stop control trigger signal at the time of position return control after focus control.

⑤ The outside erroneous operation detection function.

⑥ The focal position adjustment function.

Conventionally, in a camera with a zoom lens, in order to increase the focusing performance, the zooming operation is carried out in the manner that the operation is completed under the normal rotation driving condition at the time of reverse rotation control even in the lens barrel which has backlash at the time of zooming control. In such a case, looseness of the mechanism is absorbed under the normal rotation driving condition. However, when the zooming operation is completed, and the lens barrel is touched by hand, looseness, which has been absorbed, is removed. After that, when the photographing operation is carried out without touching the zoom lens, the focal position is adversely changed.

In the present invention, the driving section for the change of the focal length and the driving section for the focusing operation are composed of the same mechanism. Accordingly, when the focusing operation is controlled by the normal rotation, the backlash at the time of zooming operation is finally eliminated at the time of focusing operation even when looseness is removed by the outside operation, or even when the lens barrel is intentionally moved forward or backward. Therefore, backlash absorption control of the lens barrel is not necessary, and stable focusing performance can be obtained.

The initial position control of the lens barrel is carried out by the time control after the rise of the SPOS. The driving motor is reversed and a current flows until the SPOS is lowered. After the SPOS has been lowered, the above-described condition is maintained for a predetermined time, and then the driving motor is stopped. This predetermined time can be changed for the purpose of adjusting the individual difference of the retracted lens position. Although time is used for controlling the predetermined amount, pulses (LDP1) generated from the motor may be used.

When the main switch of the camera is ON, it is checked whether the SPOS is Hi. Then, after 5 rising portions of LDP2, the stop control operation is conducted, and preparation for wide range photography is completed. When the SPOS is low at the time of the start of the control, the lens barrel is initialized and the same processing is carried out.

The cam groove 3b provided on the cam barrel 2, according to the present invention, is parallel (at right angles with the optical axis) with the direction of rotation of the cam barrel in the focusing range, and this type cam is called a horizontal cam. The horizontal cam is provided for the following reasons.

In the case of the step zoom, a portion, which is actually used at the time of photography, is only in the focusing region. Accordingly, it is sufficient that good focusing accuracy is maintained only in this portion, and in the focal length change portion, only the zooming function is necessary. Accordingly, the horizontal cam is advantageous in that the focusing accuracy is retained in the focusing region. The RC sliding frame 6 is engaged with the cam and slid in the groove, and some play is necessary for the RC sliding frame in order to ensure operability. In this case, the play is generated in the direction of the rotation. In the case where play is provided in the direction of the rotation, when the engaging cam is inclined, the RC sliding frame 6 is moved in the direction of the optical axis due to this play, which influences the focusing accuracy. In play in the direction of rotation of the RC sliding frame 6, the influence of the horizontal cam on the focusing accuracy is the least. There are individual differences in the shape and dimensions of parts provided around the RC sliding frame 6. Even when there is individual difference in the direction of the rotation in the above-described individual differences, if the horizontal cam is used, only the position, at which the cam is used, is changed, and positional error of the lens does not occur. That is, finally, the generation of the focal length error is improved. When the cam is inclined, the periphery of the RC sliding frame 6 is deformed when the power is transmitted to the cam. Since the lens is changed in the direction of the optical axis due to the deformation, the focusing accuracy is lowered due to the dispersion of the amount of deformation. In order to improve this lowering of the focusing accuracy, the rigidity of the RC sliding frame 6 is increased, however, this results in larger size and higher cost of the zooming mechanism. Especially, when the cam is made of plastic, the horizontal cam is adequate. The RC sliding frame 6 is engaged with the cam groove 2d by the RC cam pin 8. When the sliding frame does not move smoothly, abrasion in addition to deformation of the sliding portion occurs. In order to prevent the abrasion, the driving load of the cam inclination, and the pressure on the sliding surface are decreased. The horizontal cam is sufficient for the above-described operations. The cam barrel 2 is integrally molded of plastic, and the horizontal cam shape is very stable. Since the cam is horizontally formed, $FC_S:RC_S$ has the characteristic of 2:1 ($FC_S$:the amount of movement of the FC lens, $RC_S$:the amount of movement of the RC lens), that is, this ratio is determined by the ratio of the leads of two helicoids. This is due to the following reasons: in order to decrease the total length of the lens barrel by the double helicoids when the lens barrel is collapsed, the retracting efficiency of the lens barrel is high when the ratio of the leads of the helicoids is 1:1; further, when the shutter and FPC are installed in the lens barrel, it is preferable that the leads of the helicoids are the same. Accordingly, the ratio of the movement of the FC sliding frame 3 and the cam barrel 2 is preferably 2:1 for mechanical reasons. Further, for the amount of the focusing movement and the focal position adjustment property in the telescopic angle range, and improvement of the lens performance in the wide angle range, it is preferable that the ratio of $FC_S$ and $RC_S$ is 2:1 even in the twin-focus system. Due to the foregoing reasons, the horizontal cam is preferable in the focusing region.

In this embodiment, the movement diagram of the FC lens 5 by the helicoid, and the movement amount of the RC lens 7 by the cam is shown in FIG. 4. Since, the RC lens 7 is moved by the horizontal cam in a range of ∞ to 0.8 m (0.6 m) in the focusing region, the movement ratio of the RC lens 7 is lower than that of the FC lens 5. Further, although the focal length switching is conducted in the range of 0.8 m to ∞, since the FC lens 5 is formed into a convex lens and the RC lens 7 is formed into a concave lens, the movement ratio of the RC lens 7 is higher than that of the FC lens 5, due to the characteristic of the zoom lens. In every focusing region, the operation region of the horizontal cam is wider than the space from the infinite position to the closest position (0.8 m), and the focal position can be sufficiently adjusted for each camera or each focal length.

Due to the foregoing reasons, when the shape of the cam in the focusing region is formed in the same direction as that of the rotation (horizontal cam), it can be seen that the horizontal cam is advantageous for accuracy, down-sizing, and cost.

In order to maintain the horizontal position of the cam and in order to accomplish the twin-focus system, it is advantageous that a member, in which the cam is set, is moved in the direction of the optical axis. Accordingly, the cam is set inside the rotating and moving barrel (cam barrel). When the horizontal cam is set at a portion which is located at an equal distance from the sliding frame 3, the whole lens barrel is protruded in the focusing operation. When the horizontal cam is set at a portion which is located at an equal distance from the fixed barrel 1, the focusing operation is carried out by the front lens focusing.

Further, it is not necessary that the ratio of the protrusion of the FC lens and RC lens is the same for each focal length. That is, in order to decrease the sensitivity for error in the telescopic angle range, the amount of the movement of the RC lens is sometimes increased. Inversely, in order to decrease the amount of the movement of the FC lens, the amount of the movement of the RC lens is decreased. Further, in order to increase the lens performance of the wide angle lens, the amount of the movement of the RC lens is increased. That is, the most preferable system for the camera may be selected.

Considering the adjustment of the individual focal position difference, it is convenient that cams are linear, however the cams are not limited to being linear. It is not always necessary that the direction of the movement of the RC lens is the same as that of the FC lens. Further, the amount of the movement of the RC lens may be larger than that of the FC lens.

In the present invention, the following variation can be considered. That is, in FIG. 4, in the range in which the focal length switching operation is carried out, the sharpest inclination is between the wide portion (W) and M1, and the cam inclination is sharp. This is the reason why the inclination of the track of the RC lens is sharper in the wide angle range than in the telescopic angle range, in the case where the track of movement of the FC lens is made linear. The inclination of the cam is the sharpest in the range between the wide portion and M1 when the movement amount of the FC lens is divided into equal portions. When the inclination is so sharp as described above, since the load for driving the lens barrel is increased, normally, the rotation angle of the cam barrel is enlarged, and the inclination angle of the cam is lowered to less than 45°. However, when the rotation angle of the cam barrel is enlarged, time for switching the focal length and for focusing is increased, or a sufficient gear ratio for the driving portion can not be obtained. Here, when the closest distance for photography in the wide angle range is limited, the inclination can be allowed to be slightly lowered. Normally, in a zoom lens, when close distance photography is carried out in the telescopic angle range in which magnification is large, the closest distance photography is not always necessary in the wide angle range. Further, in order to carry out the close distance photography in the wide angle range, the load on the lens design is large. Further, in the case of the telephoto type 2-group zoom, since the protrusion amount of the zoom lens is different for each focal length in the focusing system except the front lens focus system, the same driving control is not always conducted for each focal length. In the zoom lens barrel which has an independent focusing region for each focal length as described above, when the appropriate closest distance is set for each focal length, considering the cam portion of the driving system and the lens design, a high efficiency mechanism, and a down-sized and lower cost photographing lens can be supplied.

Although a 2-group zoom lens is described above, also in a multi-group zoom lens, not less than 3-groups, the same effect can be obtained when more than 2-group lenses, in the lenses used for magnification, are used for focusing and focal position adjustment. Naturally, in the case of multi-group zoom lenses, it is considered that the above-described operations are conducted with the overall protrusion operation, the front lens focusing operation, the rear focusing operation, or the inner focusing operation. When the case where a single-lens group is moved, is compared with the case where other magnification lenses are also moved with the single-lens group, the following effects can be obtained:

1. the movement ratio between two-group lenses is different, and the amount of movement of the original focus lens groups is changed;

2. the focal position adjustment is carried out for each focal length, and effects of the adjustment of the distance between the lens groups, and effects of the adjustment of the overall lens groups can be obtained when focal position adjustment is carried out; and 3. the synthetic focal length (angle of view) is changed when compared with that in the case of the single protrusion of the original focus lens groups.

When the above-described effects simultaneously occur, all the effects are also included in the present invention.

According to the present invention, when the RC lens, in addition to the FC lens, is moved at the time of focusing, a high resolving power of the focus control can be obtained, the influence of the error of the stop position over the accuracy of the focal position can be decreased, and the focal position adjustment mechanism can be simplified. Further, since the lens performance in the protrusion mode can be improved, a high performance, down-sized, and low cost lens can be provided. As a whole, because of a high focusing performance, reasonable focal position adjustment, and improvement of the lens performance and the like, a high performance, small, and low cost zoom lens barrel can be accomplished.

What is claimed is:

1. A zoom lens barrel comprising:

a zoom lens including a first lens group and a second lens group located farther from an object than said first lens group;

a first lens frame for holding said first lens group therein;

a second lens frame for holding said second lens group therein;

a cam barrel having a helicoid for engaging said first lens frame;

a first cam groove disposed on said cam barrel;

a second cam groove disposed on said cam barrel;

a cam pin, disposed on said second lens frame, for engaging said first and second cam grooves, wherein said cam pin engages said first cam groove while a focusing operation is conducted and said cam pin engages said second cam groove while a focal length switching operation is conducted; and a moving mechanism for moving said first and second lens groups, wherein said moving mechanism stepwise switches focal length of said zoom lens by moving said first and second lens groups, said moving mechanism adjusting a focal point of said zoom lens by moving said first and second lens groups while changing a gap between said first and second lens groups after a predetermined focal length is selected.

2. The zoom lens barrel of claim 1, wherein said moving mechanism rotates said cam barrel so as to move said first and second lens groups.

3. The zoom lens barrel of claim 1, wherein said first cam groove is positioned perpendicular to an optical axis of said lens barrel and said second cam groove is positioned at an incline with respect to said optical axis.

4. The zoom lens barrel of claim 1, wherein said first and said second cam grooves communicate with each other.

5. The zoom lens barrel of claim 1, wherein said first lens group has a convex lens and said second lens group has a concave lens.

6. The zoom lens barrel of claim 1, wherein said moving mechanism adjusts said focal point of said zoom lens by moving said first and second lens groups relative to said cam barrel.

7. A zoom lens barrel comprising:

a zoom lens including a first lens group and a second lens group;

a first lens frame for holding said first lens group;

a second lens frame for holding said second lens group;

a cam pin disposed on said second lens frame;

a cam barrel having a helicoid for engaging said first lens frame and a cam groove for engaging said cam pin; and a rotating mechanism for rotating said cam barrel, wherein said first and second lens groups are moved at the same time according to the rotation of said cam barrel so as to switch a focal length of said zoom lens stepwise and adjust a focal point of said zoom lens, a gap between said first and second lens groups being changed during the adjustment of said focal point.

8. The zoom lens barrel of claim 7, wherein said cam groove includes a first cam groove and a second cam groove.

9. The zoom lens barrel of claim 8, wherein said cam pin engages said first cam groove during the adjustment of said focal point and said cam pin engages said second cam groove during the switching of said focal length.

10. The zoom lens barrel of claim 9, wherein said first and said second cam grooves communicate with each other.

* * * * *